UNITED STATES PATENT OFFICE.

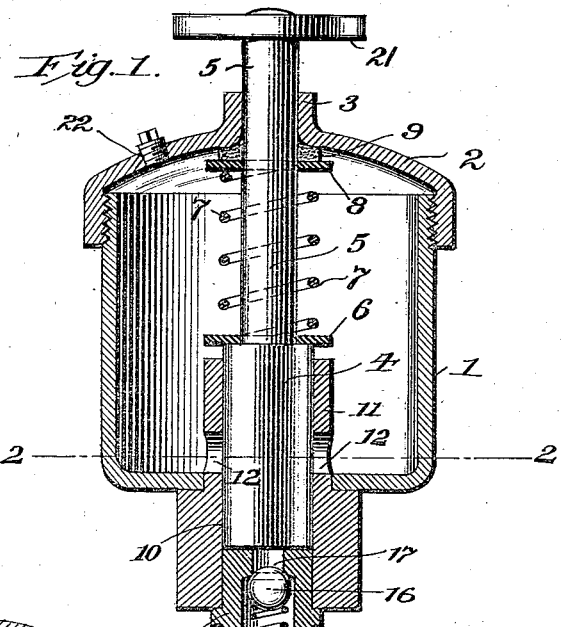
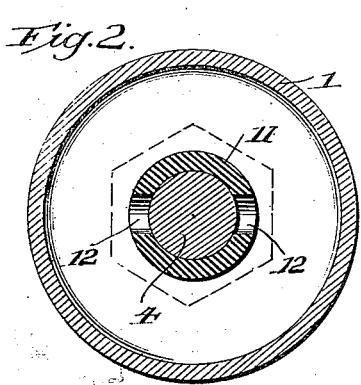
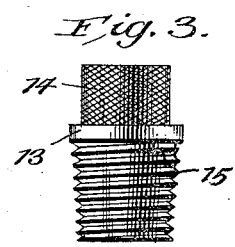

WILLIAM H. PUTNAM, OF MADISON, WISCONSIN, ASSIGNOR TO MADISON-KIPP LUBRICATOR COMPANY, OF MADISON, WISCONSIN, A CORPORATION OF WISCONSIN.

LUBRICATOR.

1,262,981.  Specification of Letters Patent.  Patented Apr. 16, 1918.

Application filed November 14, 1917. Serial No. 201,984.

*To all whom it may concern:*

Be it known that I, WILLIAM H. PUTNAM, a citizen of the United States, residing at Madison, in the county of Dane and State of Wisconsin, have invented a certain new and useful Improvement in Lubricators, of which the following is a specification.

My present invention pertains to improvements in lubricators, and more particularly to that type in which the lubricant is adapted to be forced therefrom through the action of a plunger or the like.

The structure may be said to partake of the form of a grease-cup in which there is mounted a pump or plunger that serves, when actuated, to force the lubricant past a valve and to a point where it is to be utilized.

The structure is designed for use more particularly in connection with those parts which are difficult to lubricate as, for instance, spring bolts or shackle bolts on motor cars or motor trucks though, of course, it is susceptible of being employed in any place where the lubricant is advantageously forced to the point where it is needed.

The invention is shown in the annexed drawings, wherein:

Figure 1 is a vertical sectional view of the structure, the piston and its actuating rod being shown in elevation;

Fig. 2 a horizontal sectional view, taken on the line 2—2 of Fig. 1; and

Fig. 3 an elevation showing certain portions of the structure in detail.

Referring to the drawings, 1 denotes a cup or reservoir, provided with a cap 2, having a centrally-disposed, upwardly-extending hub or boss 3, the cup or body and cap being threaded so that they may be interconnected though, of course, any other form of interlock between the parts may be employed. The cap is preferably bowed upwardly, as shown in Fig. 1, for a purpose which will presently be described. 4 denotes a piston or plunger from which extends a stem 5, said stem passing upwardly through the hub 3. A washer 6 overlies the upper face of the piston or plunger, and a spring 7 rests at its lower end upon said washer and bears at its upper end against a similar washer 8, said washer 8 in turn contacting with a cork or felt packing element 9 which surrounds the stem 5 immediately below the hub 3.

The cylinder of the pump is denoted by 10, and is provided with an upward extension or piston-guide 11, having ports 12 which, when the parts are assembled, stand in line with the upper face of the bottom of the cup or body 1. The lower portion of the cylinder, or the body in which it is formed, is somewhat larger than the opening in the bottom of the cup through which the upward extension or piston-guide 11 is inserted; in other words, the member of which the cylinder 10 and guide 11 are formed is shouldered and the outer diameter of the cylinder is such that when the parts are assembled the cylinder, below the ports 12, makes a tight fit with the opening. The parts may, of course, be sweated together in order to insure an absolutely tight joint at this portion of the structure.

The cylinder 10 and its upwardly-projecting portion 11 are bored through so as to produce an interior diameter into which the piston will exactly fit, and by boring them through I am enabled to produce a better finish, at a lower cost, than would otherwise be obtainable, for where one seeks to counter-bore a part and finish it the operation is expensive and sometimes unsatisfactory results are produced.

The valve-cage or casing takes the form of a hollow plug 13, the upper reduced portion of which is knurled, as at 14, and which knurling permits the cage to be driven into the lower end of the cylinder 10 and to make a tight fit therewith. The lower outer portion of the cage is threaded, as at 15, in order that the cup may be readily secured in place. A ball valve 16 is held against a seat 17 formed in the upper end of the cage by a spring 18, which is held in position by a plug 19 screwed into the lower end of the valve-cage, said plug having a bore 20 extending therethrough, as shown in Fig. 1.

Spring 7 normally forces the piston 4 downwardly to the position shown in Fig. 1, closing the ports 12 and resting upon the upper end of the valve cage. When it is desired to force the lubricant to the desired point, the operator will grasp the disk shaped head 21 secured upon the stem 5, and draw the stem and piston upwardly until the lower end of the piston clears the ports 12. This allows the oil to flow through said ports and into the upper end of the cylinder, and upon a retrograde movement of the piston (either by force applied manually or through the action of the spring 7) the lubricant contained in the cylinder will be forced outwardly through the opening or seat 17, past the valve 16, and through the bore 20.

In the use of these cups it is customary to fill them to the top of the body 1, and if the cap or cover 2 were flat and made a close fit with the upper edge of said body the lubricant would be forced outwardly between such parts upon the first upward movement of the piston, for there would be no room for the displacement of the lubricant at such time. By making the cover rounded or bow-like sufficient clearance above the top of the cup is obtained; thus room for displacement is provided for, and the lubricant will not be forced outwardly between the parts, nor up around the stem where it passes out through the hub 3.

It is, of course, evident to those skilled in the art that instead of bowing the cover, it may be made flat and the threads stop short of the inner face of the cover, so as to provide a space or clearance, as just mentioned.

The packing 9 is provided for the reason that it is almost impossible in a structure of the present type to produce a proper alinement between the cylinder and the hub through which the stem passes, but by providing a sufficient clearance between the stem and the hub, and utilizing a packing element at this point the piston has only to make a neat fit with the bore of the cylinder, and the hub does not have to accurately aline with the stem which is rigidly attached to the piston 4.

In the past grease-cups have been used almost exclusively for the purposes first mentioned above, and oil would be employed if it were possible to load up the oil-cups easily and then after they were loaded have some means for forcing the oil out of the cup or receptacle to the part to be lubricated. The present device enables this to be done. Heavy viscous oils may be employed, and the oil forced to its place even in cold weather, when, as is well known, oil becomes rather stiff or thick. By making the cap removable such thick oil may be readily placed in the cup though, of course, when the oil is thin the cup may be filled through an opening, as 22, formed in the cap or cover 2.

The construction as above set forth, while effective and filling a want which has hitherto been unfilled, is simple of manufacture and relatively cheap.

While the invention has been described in detail, it is conceivable, of course, that in so far as the generic idea is concerned, the structure may be modified without departing from the spirit of the invention.

Having thus described my invention, what I claim is:

1. In a lubricator, the combination of a cup; a member secured in an opening formed in the cup, said member being finished to provide a cylinder and a piston-guide, said guide extending upwardly in the cup and having a port opening from the cup to the upper end of the cylinder; a piston mounted to reciprocate in said cylinder and guide; a stem extending outwardly from the piston; a hollow member secured in the lower end of the aforesaid member in which the cylinder is formed; a valve located in said member and serving to close the opening leading from the cylinder; and a spring serving to hold the valve against its seat.

2. In a lubricator, the combination of a cup; a member secured in an opening formed in the cup, said member being finished to provide a cylinder and a piston-guide, said guide extending upwardly in the cup, and said member having a port opening from the cup to the upper end of the cylinder; a piston mounted to reciprocate in said cylinder and guide; a stem extending outwardly from the piston; and an outwardly-bowed cover for the cup, said cover having a hub formed thereon through which the stem extends.

3. In a lubricator, the combination of a cup; a member secured in an opening formed in the cup, said member being finished to provide a cylinder and a piston-guide, said guide extending upwardly in the cup and said member having a port opening from the cup to the upper end of the cylinder; a piston mounted to reciprocate in said cylinder and guide; a cover for the cup provided with a centrally-disposed hub; a stem extending upwardly from the piston through said hub and making a loose fit therewith; a packing member surrounding the stem and located below the hub and bearing against the inner wall of the cover; and a spring located between the upper end of the piston and the under face of the packing, whereby the packing will be held to its position and the piston forced inwardly.

4. In a lubricator, the combination of a cup; a member secured in an opening formed in the cup, said member being finished to provide a cylinder and a piston-guide, said guide extending upwardly in the cup and said member having a port opening from the cup to the upper end of the cylinder, said cylinder likewise being provided with a discharge port; a piston mounted to reciprocate in said cylinder and guide; a cap or cover for the cup, said cap having a centrally-disposed hub in line with the cylinder; a stem extending outwardly from the piston and loosely through the hub; a packing surrounding the stem and bearing against the under face of the cap; a spring interposed between the under face of the packing and the upper end of the piston and serving to normally hold the packing in place and force the piston inwardly; and a spring-seated valve normally closing the discharge port of the cylinder.

5. In a lubricator, the combination of a cup; a member secured in an opening formed in the lower portion of the cup, said member being finished to provide a cylinder and a piston-guide, said guide extending upwardly in the cup and said member having a port opening from the lower portion of the cup into the upper end of the cylinder; a piston mounted to reciprocate in said cylinder and guide; a cap or cover for the cup, said cap being bowed outwardly and provided with a centrally-disposed hub; a stem extending upwardly from the piston, through said hub and making a loose fit therewith; a packing surrounding the stem and bearing against the inner face of the cap; a spring interposed between the packing and the piston, whereby the piston is forced downwardly and the packing held in close relation to the cap; a hollow member mounted in the lower end of the aforesaid cylinder-forming member, said hollow member being provided with a port opening into the lower end of the cylinder; a ball-valve mounted in said hollow member and closing said port; a plug screwed in the lower end of said hollow member, said plug being provided with an opening extending therethrough and communicating with the bore of the hollow member; and a spring bearing upon said plug and the valve and normally urging the same to its seat.

6. In a lubricator, the combination of a cup; a member secured in an opening formed in the cup, said member being finished to provide a cylinder and a piston-guide, said guide extending upwardly in the cup, and said member having a port opening from the cup to the upper end of the cylinder; a piston mounted to reciprocate in said cylinder and guide; a stem extending outwardly from the piston; and a cover for the cup, said cover having an interior space above the upper edge of the cup, and likewise having a hub formed thereon through which the stem extends.

In testimony whereof I have signed my name to this specification.

WILLIAM H. PUTNAM.